United States Patent [19]

Jones et al.

[11] Patent Number: 5,889,529

[45] Date of Patent: *Mar. 30, 1999

[54] SYSTEM AND METHOD FOR GENERATING AND DISPLAYING COMPLEX GRAPHIC IMAGES AT A CONSTANT FRAME RATE

[75] Inventors: Michael T. Jones, Los Altos; David L. Dignam, Belmont; Gregory M. Eitzmann, Palo Alto, all of Calif.

[73] Assignee: Silicon Graphics, Inc., Mountain View, Calif.

[*] Notice: This patent issued on a continued prosecution application filed under 37 CFR 1.53(d), and is subject to the twenty year patent term provisions of 35 U.S.C. 154(a)(2).

[21] Appl. No.: 620,215

[22] Filed: Mar. 22, 1996

[51] Int. Cl.⁶ .................................................. G06T 3/00
[52] U.S. Cl. ............................................................. 345/439
[58] Field of Search ................................. 395/139, 128, 395/133, 173, 174, 806, 807, 118; 345/439, 428, 433, 418, 302, 473, 474

[56] References Cited

U.S. PATENT DOCUMENTS

4,703,439  10/1987  Lotz ........................................ 355/451
4,797,836  1/1989   Witek et al. ............................. 345/473
5,113,455  5/1992   Scott ........................................ 382/47

*Primary Examiner*—Almis R. Jankus
*Attorney, Agent, or Firm*—Sterne, Kessler, Goldstein & Fox P.L.L.C.

[57] ABSTRACT

A system and method for dynamically resizing graphic images of variable image complexity to generate display images at a constant frame rate for output to a display device. In one frame, an image resolution is determined and a graphic image is drawn to the determined image resolution. In the subsequent frame, the graphic image is magnified to a target resolution prior to being output to a display device. The synchronization of the drawing of the graphic image and its display is managed by a swap buffer signal. The present invention further provides for the double buffering of graphic images and their corresponding image resolutions. The present invention further provides for the independent dynamic resizing of multiple channels, such that, a plurality of display devices can independently resize graphic images of variable complexity at a constant frame rate.

39 Claims, 3 Drawing Sheets

SYSTEM AND METHOD FOR GENERATING AND DISPLAYING COMPLEX GRAPHIC IMAGES AT A CONSTANT FRAME RATE

BACKGROUND OF THE INVENTION

1. Field of the Invention

This invention relates to computer graphics, and more specifically to a computer system that generates graphic images of variable image complexity at a constant frame rate. The invention uses reduction and magnification capabilities to generate graphic images at a constant frame rate, thereby creating a continuous and smooth visual effect.

2. Related Art

Many computer applications that use computer graphics require the system to generate those graphic images at a constant frame rate. These applications include visual simulation and virtual reality in which the user operates in an interactive graphic environment. Specific environments include: pilot and driver training, medical and surgical preview, medical diagnosis and analysis, computer-aided design, and any other application where a user needs to walk-through or manipulate data. In these applications, the graphic images are the most important feature of the system. Users require the images to be continuous with smooth transitions as they move their heads or fields of vision.

Continuous graphic images are ensured when the computer system generates those images at a constant frame rate. The system must process and generate each image within the time limit of one frame or field of video. The system cannot extend the processing of an image beyond the time limit of one frame without impacting the visual effect and generating a variable frame rate. When a system does not adhere to a constant frame rate, and generates images at a variable frame rate, the user is subject to sudden and abrupt image updates. Such spasmodic updates detract from the realism of the experience and are visually disturbing to the user. Therefore, a constant frame rate is required to achieve a realistic and effective interactive graphic environment.

In addition to the user's need for a constant frame rate, the majority of display devices used with interactive graphic environments only accept graphic images for display at a constant frame rate. These devices cannot handle the receipt of graphic images at a varying rate. These display devices include computer monitors, projectors, television sets, video cassette recorders (VCR), and video display helmets. Similarly, all of these devices display the graphic images at a constant output video rate. The frame rate at which the computer system generates the graphic images may, or may not, be equivalent to the video rate of the display device.

During a simulation or other interactive graphic environment, there are varying computational burdens placed on the video hardware of a computer system. This computational burden on the system varies depending on the image complexity. The burden increases in proportion to the increase of image complexity. The graphical image to be generated and displayed may range from a simple view of the sky to the complex view of a city. In each instance, the video hardware must generate the image within the time allotted for a single frame.

The problem arises when the image complexity prevents the graphics hardware from drawing the image within the time limit of one frame. If the processing time of an image extends beyond one frame, the typical result is that the image currently displayed is repeatedly displayed for as many frames as it takes the video hardware to finish the computation of the new image. This repetitious display of the same image reduces the actual video display rate and seriously compromises the realism of a simulation.

One approach to ensuring a constant frame rate is to set the frame rate low enough to ensure that an image of any complexity could be generated and displayed within one frame. This is an unreasonable solution for several reasons. First, the video hardware would always be executing at its lowest capacity. Second, the video effect on the user would be degraded and detract from the realism of the experience.

A second approach to maintaining a constant frame rate focuses on only drawing objects of the image that are in the field of view, and reducing the complexity of the objects that are far away. This approach maximizes the performance of the graphics hardware, as opposed to guaranteeing a specific frame rate.

A third approach involves the use of vector displays which are monitors that can display images at a variable frame rate. Thus, if it takes longer than the nominal frame time to draw an image, the frame time is simply extended. This approach has two disadvantages. First, vector displays are expensive compared to conventional raster monitors. Second, the frame time can only be extended slightly before either a visible flicker or image smear occurs when displaying the image, thereby impairing the realism of the display.

Therefore, there is a need for a computer system to automatically adjust to the complexity of an image on a per frame basis when generating graphic images at a constant frame rate.

SUMMARY OF THE INVENTION

The present invention reduces the time it takes to generate a complex graphic image, thereby ensuring that the image is generated within one frame. When more than one frame is needed to generate an image or when the computational time approaches the frame limit, the image resolution, or size, is simply reduced. A smaller version of the image requires less computational time of the video software to generate the image because the fill rate of the image, i.e., the time to draw the image, is proportional to the number of pixels in the image. Drawing at a lower resolution can reduce the number of pixels per line, the number of lines of the image, or both. The fill demand is reduced by the proportion of pixels reduced. After the video software draws a reduced image, the image is magnified back up to its target resolution, or size, prior to sending it to the display device. This procedure generates complex graphic images within a single frame and ensures a constant frame rate.

To ensure a continuous and smooth visual effect of displayed images during a simulation, the resolution of each image is determined on a frame by frame basis and synchronized with the display of each image. If appropriate, an image is drawn at a reduced resolution, then magnified to the target resolution prior to display. Therefore, each frame may have a different image resolution. This procedure allows for the input of images with variable complexity while providing a constant frame rate of output with a constant target resolution to a display device.

This invention also provides multi-channel capability, which is the ability to dynamically resize the graphic images of multiple display devices. The present invention independently controls the channel of each display device such that each display device can use different image resolution.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

The present invention dynamically resizes graphic images of variable complexity to generate display images at a constant frame rate and of a constant target resolution. Within one frame, a graphic image is drawn according to an image resolution. In the subsequent frame, the drawn image is then output to a display device to a target resolution. Therefore, graphic images, regardless of image complexity, are processed and displayed at a constant frame rate.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is described in the example environment of a computer system having video software adapted to continuously reduce the resolution of graphic images from a target resolution, and video hardware adapted to continuously magnify graphic images back to the target resolution. More specifically, after describing the present invention in detail, it will become apparent to one skilled in the relevant art how to make these adaptations.

Figure 1:
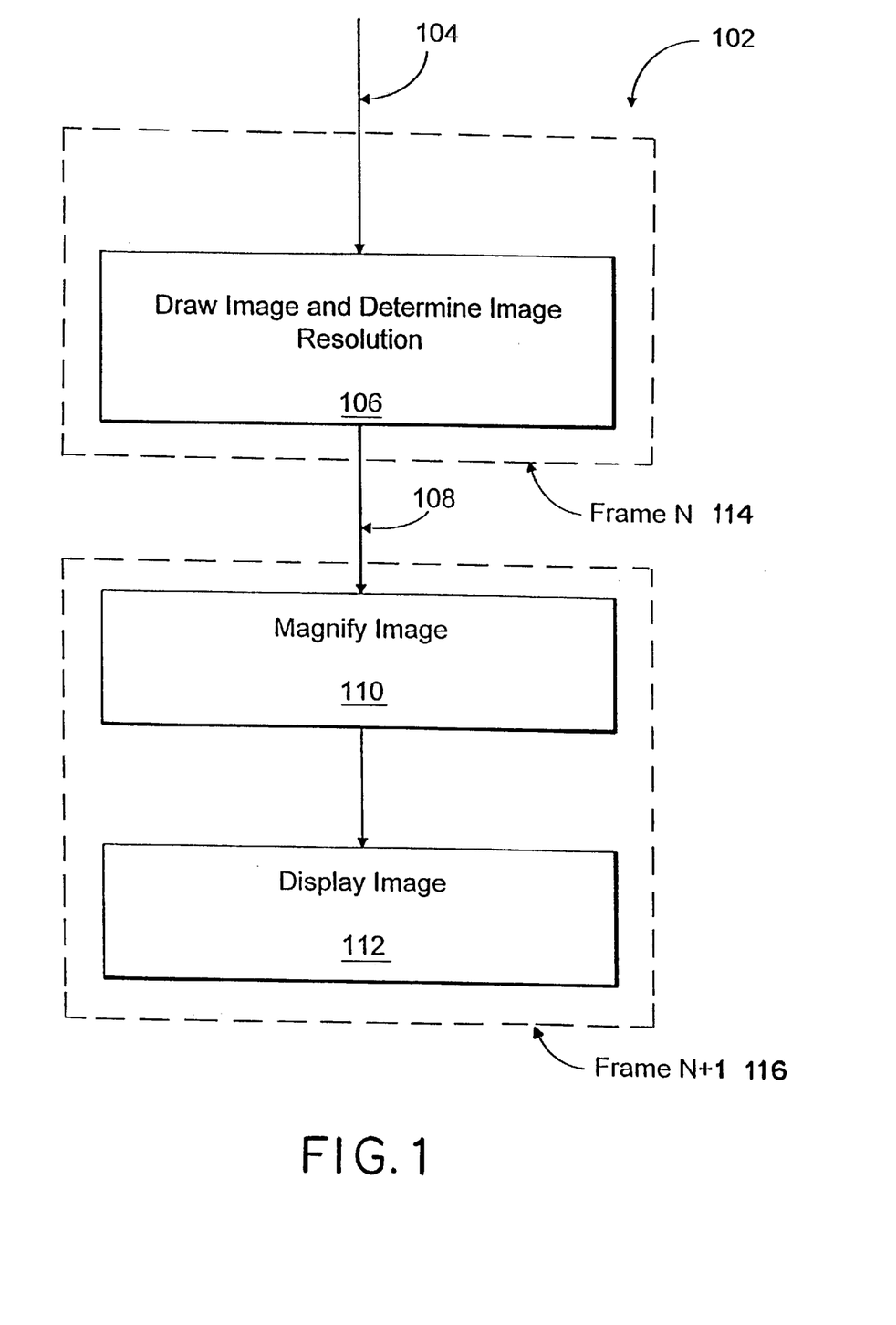
FIG. 1 is a control flow diagram illustrating an overview of dynamic image resizing.

The overall control flow of the present invention is illustrated in FIG. 1. In FIG. 1, video software generates and draws one graphic image per frame, Frame N 114. The image is of variable complexity and is to be displayed with a target resolution during the subsequent frame, Frame N+1 116.

Referring again to FIG. 1, in step 106 during Frame N 114, the video software first determines an image resolution to be used when drawing the current image to a frame buffer. The image resolution comprises the resolution coefficients used to draw the current image. The image resolution may or may not be the target resolution. After determining the image resolution, the video software draws the current image to a frame buffer according to the image resolution. Step 106 is described in further detail below.

Step 106 completes, within the time period of one frame, such as Frame N 114, the drawing of an image into a frame buffer which is accessible by video hardware. After step 106, the video hardware in step 110 reads the drawn image from the frame buffer and outputs the drawn image to a display device at the target resolution. The video hardware magnifies the image by the percentage that the image was reduced when the image was drawn in step 106. The magnification ensures that the image is displayed at the target resolution required by the display device. It is an important feature of the present invention that the image position is constant during magnification. A constant image position ensures a users's illusion of no change in the image content. In step 112, the image is displayed to a user. The video hardware completes steps 110 and 112 within the time period of one frame, Frame N+1 116.

Figure 2:
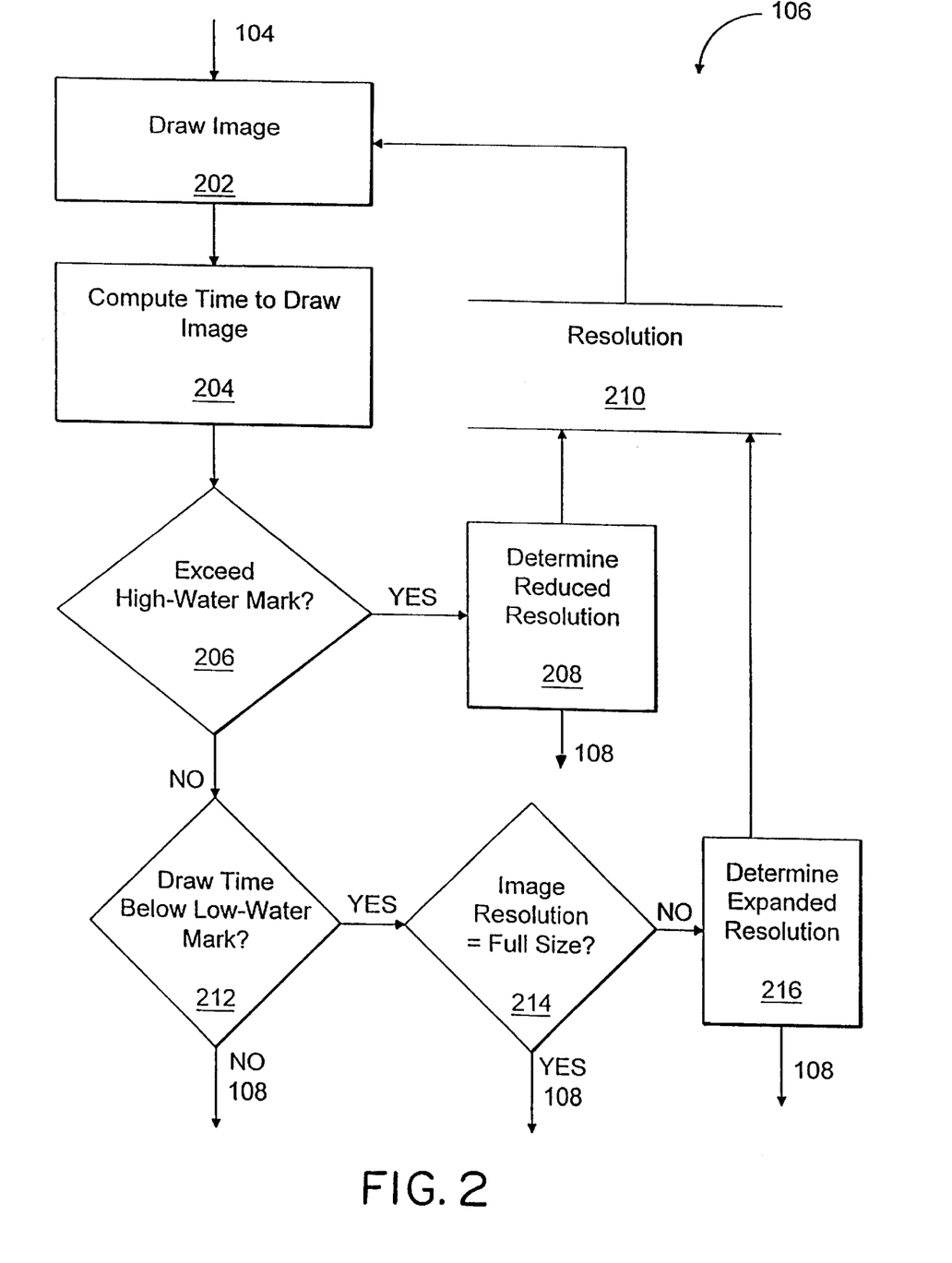
FIG. 2 is a control flow diagram illustrating the first step of the dynamic image resizing process of drawing an image and determining image resolution.

FIG. 2 describes the details of the video software in step 106 of FIG. 1. The process of step 106, determining an image resolution and drawing the current image to that resolution to a frame buffer, is completed within the time period of one frame, Frame N 114. There are multiple methods available for determining an image resolution of a current image. For example, the video software can perform an analysis of image complexity based on the content of the current image to be drawn, or can perform an analysis on multiple previous images, thereby identifying a trend in image complexity. The chosen embodiment of the present invention, however, determines an image resolution based solely on the performance of the previous frame. That is, the time it took to draw the previous frame's image is the basis for the image resolution of the current image. It is to be understood that this retroactive analysis of the present invention is described for convenience purposes only. It is not intended that the invention be limited to application in this example environment. In fact, after reading the following description, it will become apparent to a person skilled in the relevant art how to implement the invention in alternative environment.

Referring again to FIG. 2, in step 202, the video software draws the current image to a frame buffer. The image is drawn to an image resolution 210. After the current image is drawn, the video software proceeds to step 204. In step 204, the video software computes the draw time, the time it took to draw the current image to the frame buffer. Continuing to step 206, the video software compares the draw time of the current image to a high-water mark. The high-water mark represents a draw time at which an image resolution would start to be reduced thereby ensuring that the image can be drawn within one frame time period. The draw time increases or decreases in proportion to the complexity of the current image.

Referring again to step 206, if the draw time increases to the point of exceeding a high-water mark, the video software proceeds to step 208. In step 208, the video software determines a new reduced image resolution 210. The image resolution 210 is then used during the drawing of the next frame's, Frame N+1, image in step 202. The video software exits step 208, thereby exiting step 106, and waits for the start of the next frame, frame N+1 116.

Referring again to step 206, if the draw time does not exceed the frame time, then the video software continues to step 212. In step 212, the video software compares the draw time of the current image to a low-water mark. The low-water mark represents a draw time at which a reduced image resolution would start to be increased. If the draw time for the current image is less than the low-water mark, the video software proceeds to step 214. In step 214, the video software checks if the image resolution equals the target resolution. If yes, then the image cannot be expanded because the image is already drawn to the target resolution. In this case, the image is one of low complexity. The video software exits step 214, thereby exiting step 106, and waits for the start of the next frame, Frame N+1 116.

Referring again to step 214, if the image resolution does not equal the target resolution, the video software proceeds to step 216. Step 216 indicates that the image was drawn at a reduced image resolution and that the image is of a low complexity such that there is spare time during the frame. This spare time can be used to draw the next image at a higher resolution. In step 216, the video software derives an expanded image resolution and stores it as the new image resolution 210. After which, the video software exits step 216, thereby exiting step 106, and waits for the start of a new frame, Frame N+1 116.

Referring again to step 212, if the draw time is not below a low-water mark, then the image resolution is appropriate for the complexity of the current image. The video software exits step 212, thereby exiting step 106, and waits for the start of the next frame, Frame N+1 116.

During continuous operation, a first frame, such as frame 1, the image resolution 210 used to draw a first image, such as image 1, equals the target resolution. In the next frame, such as frame 2, the draw time of image 1 forms the basis of the image resolution used to draw a second image, such as image 2, to the frame buffer. Likewise, in a frame 3, the draw time of image 2 is the basis of the image resolution used to draw image 3 to the frame buffer. This process is repeated every frame.

Figure 3:
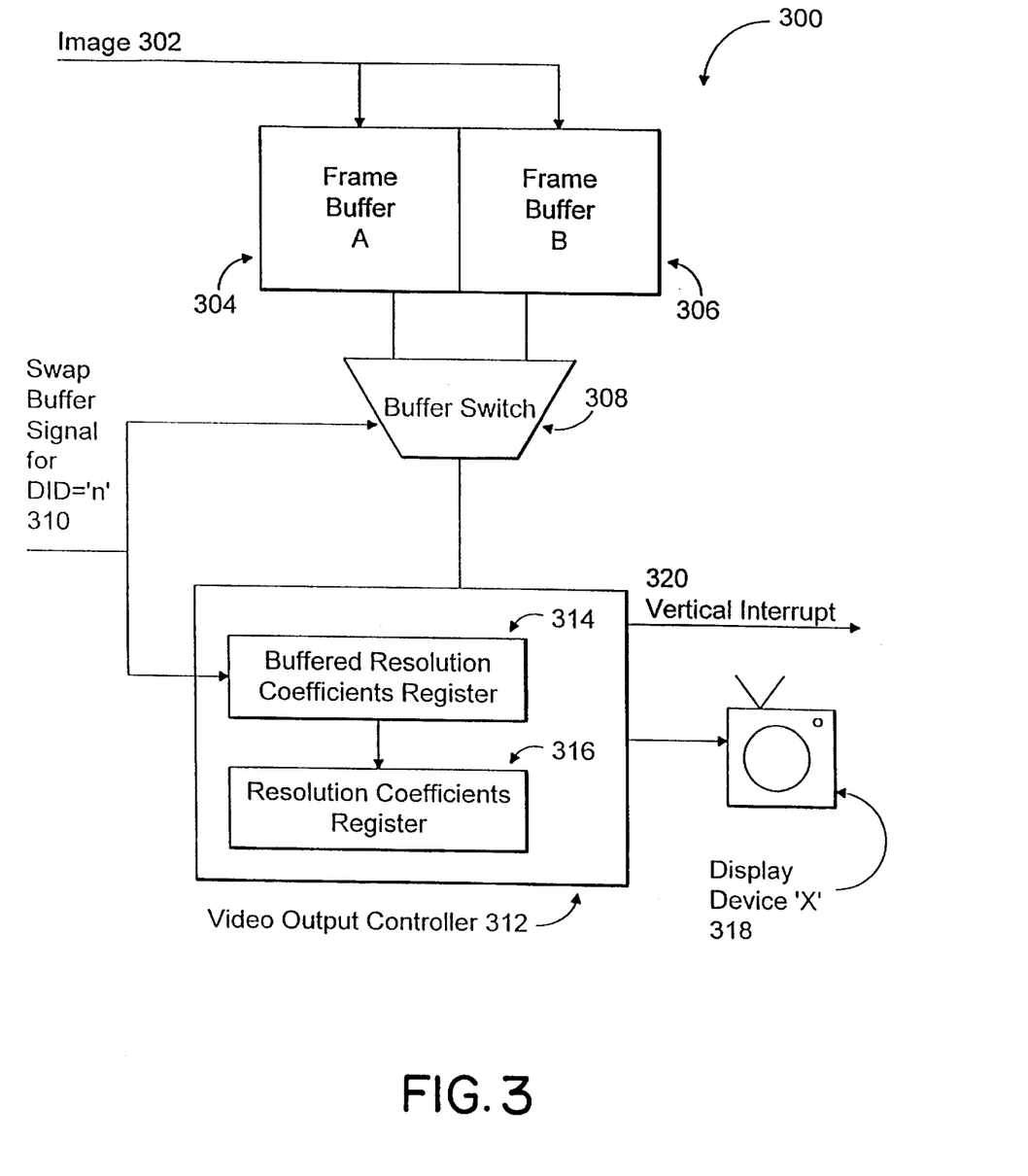
FIG. 3 is a block diagram illustrating dynamic image resizing synchronizing of display channel 'X' with DID='n.'

FIG. 3 is a block diagram showing the synchronization required for the present invention of dynamic image resizing. More specifically, FIG. 3 illustrates the synchronization between the video software of step 106, which draws an image into a frame buffer during Frame N 114, and the video hardware of step 110, which outputs an image to a display device during Frame N+1 116.

Similar to conventional video systems, the present invention double buffers graphic images. Double buffering comprises logically dividing a frame buffer into two (2) frame buffers, for example, Frame Buffer A 304 and Frame Buffer B 306. In operation, the video software draws an image into one frame buffer, such as Frame Buffer A 304, while the video output controller (VOC) 312 reads a previously drawn image from the second frame buffer, Frame Buffer B 306, and outputs that image to a Display Device 'X' 318.

Double buffering ensures that a user is never viewing an image as it is being drawn. For example, while the video software draws an image into Frame Buffer A 304 during Frame N 114, the VOC 312 reads the image drawn during Frame N−1 from Frame Buffer B 306, and outputs it to Display Device 'X' 318. The two frame buffers, Frame Buffer A 304 and Frame Buffer B 306, are swapped frame-by-frame. Thus, continuing with the previous example, in the next frame, Frame N+1 116, the video software draws an image to Frame Buffer B 306, and the VOC 312 reads the drawn image in Frame Buffer A 304 and outputs it to the Display Device 'X' 318.

As with conventional double buffering mechanisms, the present invention implements double buffering with a pointer, which in this case is called a Buffer Switch 308. The Buffer Switch 308 indicates which side of the frame buffer, either Frame Buffer A 304 or Frame Buffer B 306, to draw to and which side to read from. When the video software has completed drawing an image to one side of the frame buffer, the Buffer Switch 308 may be changed such that the VOC 312 now reads the side of the frame buffer containing the newly drawn image and the video software draws to the side of the frame buffer which the VOC 312 has just finished displaying. The Buffer Switch 308, however, must not be changed prematurely. That is, although the video software may finish drawing an image to a frame buffer at any time during a frame, the Buffer Switch 308 is not changed at that point. Changing the Buffer Switch 308 in the middle of a frame may result in the VOC 312 switching frame buffers in the middle of reading a drawn image and outputting it to the Display Device 'X' 318. Therefore, the updating of the Buffer Switch 308 occurs during vertical blanking by the VOC 312 on Display Device 'X' 318. Vertical blanking is the period of time during which the VOC 312 resets its current location on the Display Device 'X' 318 from the bottom right corner (the position after completing the output of an image) to the top left corner (the position for beginning the output of an image).

The present invention also provides multi-channel capability; that is, the ability to drive multiple display devices, each displaying a different graphic image. For example, Display Device 'X' 318 may be one of a plurality of display devices. Each channel or display device can be independently resized such that each uses a different magnification ratio and swap rates. Each display device channel is assigned a unique display ID (DID) which is used to dynamically resize that channel independent of the other channels. That is, when the frame buffers of a specific channel, such as the channel with DID='n' corresponding to Display Device 'X' 318, are to be swapped, the Buffer Switch 308 receives the corresponding Swap Buffer Signal for DID='n' 310 and swaps the frame buffers associated with that DID. A more detailed description of the DID implementation is provided below.

When outputting an image from Frame Buffer A 304 or Frame Buffer B 306, to a Display Device 'X' 318, the VOC 312 magnifies the image to the target resolution. Magnification is required if the video software reduced the image resolution in step 106 due to the image complexity. Therefore, a mechanism exists for synchronizing the video software and VOC 312 and for communicating an image's resolution to the VOC 312 thereby ensuring that the correct magnification occurs prior to display. The following description of synchronization is in terms of a single channel corresponding to Display Device 'X' 318 with channel DID='n.'.

First, the video software stores a drawn image's resolution in the Buffered Resolution Coefficients Register 314. This is accomplished in either step 208 or 214 depending on whether the image resolution is reduced or expanded respectively. This ensures that the video hardware has the correct coefficients to magnify each image for output to Display Device 'X' 318.

Second, a Swap Buffer Signal for DID='n' 310 enters a Buffer Switch 308 and the VOC 312 indicating that Frame Buffer A 304 and Frame Buffer B 306 and the associated resolution coefficients are to be swapped. Upon receiving the Swap Buffer Signal for DID='n' 310, the Buffer Switch 308 toggles the frame buffers 304, 306. If the video software was drawing an image in Frame Buffer A 304 and the VOC 312 was outputting an image from Frame Buffer B 306 to Display Device 'X' 318, then after the Swap Buffer Signal for DID='n' 310, the video software draws to Frame Buffer B 306 and the VOC 312 outputs Frame Buffer A 304. When the next Swap Buffer Signal for DID='n' 310 is received, the Buffer Switch 308 swaps the frame buffers again.

Also upon receiving the Swap Buffer Signal for DID='n' 310, the VOC 312 moves the contents of the Buffered Resolution Coefficients Register 314 to the Resolution Coefficients Register 316. Therefore, the VOC 312 uses the resolution coefficients associated with the current image being output to the Display Device 'X' 318 and the correct level of magnification occurs. This process is dynamic and capable of independently changing image resolution on a frame-by-frame basis for each display device. This process further ensures that every graphic image, regardless of its complexity, is processed for each display device within the required time period of one frame.

Third, the VOC 312 generates a vertical interrupt 320 at the start of vertical blanking on Display Device 'X' 318. The VOC 312 sends the vertical interrupt 320 to the video software and the graphics hardware to trigger the Swap Buffer Signal for DID='n' 310, thereby synchronizing the video software and VOC 312 operations.

In the chosen embodiment, the present invention implements the multi-channel feature by maintaining a table of DIDs in which each bit in the table maps to a unique DID, thereby maps to a unique channel number or display device. Thus, when there is a change in the bit for a particular DID 'n', a Swap Buffer Signal for DID='n' 310 is sent to the Buffer Switch 308 and to the Buffered Resolution Coefficients Register 314 of the VOC 312 that corresponds to the assigned channel. The Swap Buffer Signal for DID='n' 310 causes the Buffer Switch 308 to swap the corresponding Frame Buffer A 304 and Frame Buffer B 306 and causes the resolution coefficients to be loaded from the corresponding Buffered Resolution Coefficients Register 314 into the corresponding Resolution Coefficients Register 316.

The chosen embodiment of the present invention further implements the DID table of the multi-channel feature by using the X Window System. The X Window System is a standard protocol for the implementation of network-based UNIX window systems. The X Window System provides users and developers with the functionality for creating and managing a window environment in a network-based computer system; that is, an environment comprising multiple windows on multiple display devices. For more information on X Window Servers, see Israel and Fortune, *The X Window System Server*, X Version 11, Release 5, Digital Press 1992, which is incorporated herein by reference in its entirety. Description in these terms is provided for convenience only. It is not intended that the invention be limited to application in this example environment. In fact, after reading the following description, it will become apparent to a person skilled in the relevant art how to implement the invention in alternative environments.

The X Window System Server, X-Server, can manage multi-head configurations including a single graphics display connected to multiple display devices. The X-Server assigns each window, called an X-window, on a display device a unique DID and implements a standard protocol of double buffering each X-window's image. The X-Server independently swaps the double frame buffers of each X-window via a swap buffer bit associated with each DID. Thus, when the X-Server wants to swap the frame buffers of an X-window with DID='n,' the X-Server toggles the corresponding swap buffer bit resulting in that X-window's frame buffers to be swapped.

The chosen embodiment of the present invention uses this X-Server mechanism to implement the DID table of the multi-channel feature. As discussed above, the chosen embodiment makes a correspondence between each display device and a DID. Each display device's DID is an X-window DID, such that each display device, Display Device 'X' 318, comprises one X-window covering the entire display area. Therefore, each bit in the DID table is an X-Server swap buffer bit because each display device channel DID represents one X-window. The chosen embodiment uses the X-Server mechanism to swap each channel's frame buffers independently of the other channels, thereby allowing for the independent dynamic resizing of graphic images across multiple channels.

Alternative applications of the present invention include, but are not limited to the following five environments. First, a system may independently apply the present invention to different parts of a pixel. For example, pixels may contain both a foreground (overlay) and a background image. Therefore, each of these two components of a pixel would have a different resolution setting.

Second, a system may build a horizontal only, vertical only, or a scaling system with varying granularity. For example, the present invention may be applied to one line, one pixel, two pixels, four pixels, etc.

Third, a system may independently apply the present invention to one or more windows that appear on a single display device. Therefore, each window would have a different resolution setting.

Fourth a system may implement the present invention with high-order filters (bi-cubic), thereby not limiting the present invention to bi-linear interpolation. In addition, a system may incorporate special frequency-enhancing filters that sharpen lines, points, and text that had been magnified.

Fifth, a system may apply the present invention to one or more specific areas of interest of an image. For example, the system may apply the present invention to an image's border region, center region, or focal point.

While various embodiments of the present invention have been described above, it should be understood that they have been presented by the way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A video graphics system for dynamically resizing graphic images of variable complexity, comprising:
   determining means for determining a first image resolution for a first graphic image;
   drawing means for drawing said first graphic image to said first image resolution thereby producing a drawn image; and
   magnifying means for magnifying said drawn image to a target resolution thereby generating a display image;
   wherein said drawing means and said determining means execute within a time period of a single frame, and said magnifying means executes within said time period of said single frame, and
   wherein said determining means compares a computational time for drawing a second graphic image with said time period of said single frame, wherein said second graphic image precedes said first graphic image.

2. A video graphic system according to claim 1, wherein said magnifying means comprises means for performing bi-linear interpolation.

3. A video graphic system according to claim 1, wherein said magnifying means comprises means for performing linear interpolation.

4. A video graphic system according to claim 1, wherein said magnifying means comprises means for performing bi-cubic interpolation.

5. A video graphic system according to claim 1, wherein said magnifying means executes concurrently with said drawing and said determining means.

6. A video graphic system according to claim 1, further comprising double buffering means to double buffer said graphic image, wherein a first frame buffer receives said drawn image produced by said drawing means during a first frame, and a second frame buffer contains a previously drawn image produced by said drawing means during a second frame, wherein said previously drawn image is magnified by said magnifying means during said first frame, and wherein said second frame is a time period immediately preceding said first frame.

7. A video graphic system according to claim 6, wherein said drawing means and said magnifying means are synchronized by a swap buffer signal.

8. A video graphic system according to claim 1, further comprising:
- a plurality of drawing means; and
- a plurality of magnifying means;
- wherein one said drawing means and one said magnifying means correspond to a channel of a display device, thereby providing independent dynamic resizing of graphic images of variable complexity across multiple channels.

9. A video graphic system for dynamically resizing graphic images of variable complexity, comprising:
- determining means for determining a first image resolution for a first graphic image;
- drawing means for drawing said first graphic image at said first image resolution, thereby producing a drawn image; and
- magnifying means for magnifying said drawn image to a target resolution thereby generating a display image, wherein
- said drawing means and said determining means execute within a time period of a single frame, and said magnifying means executes within said time period of said single frame,
- said determining means further determines a computational time for drawing a second graphic image that precedes said first graphic image exceeds a high-water mark, and if said computational time exceeds said high-water mark, said first image resolution is determined to be less than a second image resolution at which said second graphic image was drawn; and
- said determining means further determines if said computational time falls below a low-water mark, and if said computational time falls below said low-water mark and said second image resolution does not equal said target resolution, said first image resolution is determined to be greater than said second image resolution, otherwise said first image resolution is determined to be said target resolution.

10. A video graphic system according to claim 9, wherein said magnifying means comprises means for performing bi-linear interpolation.

11. A video graphic system according to claim 9, wherein said magnifying means comprises means for performing linear interpolation.

12. A video graphic system according to claim 9, wherein said magnifying means comprises means for performing bi-cubic interpolation.

13. A video graphic system according to claim 9, wherein said magnifying means executes concurrently with said drawing and said determining means.

14. A video graphic system according to claim 9, further comprising double buffering means to double buffer said first graphic image, wherein a first frame buffer receives said drawn image produced by said drawing means during a first frame, and a second frame buffer contains a previously drawn image produced by said drawing means during a second frame, wherein said previously drawn image is magnified by said magnifying means during said first frame, and wherein said second frame is a time period immediately preceding said first frame.

15. A video graphic system according to claim 14, wherein said drawing means and said magnifying means are synchronized by a swap buffer signal.

16. A video graphic system according to claim 7, further comprising:
- a plurality of drawing means; and
- a plurality of magnifying means;
- wherein one said drawing means and one said magnifying means correspond to a channel of a display device, thereby providing independent dynamic resizing of graphic images of variable complexity across multiple channels.

16. A video graphic system according to claim 9, further comprising:
- a plurality of drawing means; and
- a plurality of magnifying means;
- wherein one side drawing means and one said magnifying means correspond to a channel of a display device, thereby providing independent dynamic resizing of graphic images of variable complexity across multiple channels.

17. In a computer-based system having a computer graphics system, a method for dynamically resizing a graphic image of variable complexity to generate a display image of a target resolution at a constant frame rate, said steps comprising:
- (a) drawing, within a time period of a single frame, the graphic image of variable complexity to a first image resolution, thereby producing a drawn image;
- (b) determining, within said time period of said single frame, a second image resolution for a second graphic image of variable complexity by comparing a computational time for drawing the graphic image of variable complexity with said time period of said single frame, wherein the graphic image of variable complexity precedes said second graphic image; and
- (c) if said first image resolution is less than the target resolution, magnifying said drawn image to the target resolution, thereby producing the display image.

18. A method according to claim 17, wherein said step (c) executes within a time period of one frame and executes concurrently with said steps (a) and (b) which also execute within said time period of one frame.

19. A method according to claim 17, further comprising the steps of:
- (d) double buffering said drawn image, wherein a first frame buffer receives the graphic image being drawn in step (a) during a first frame, and a second frame buffer stores a previously drawn image produced during a second frame, wherein said second frame is a time period immediately preceding said first frame;
- (e) double buffering said image resolution, wherein a buffered resolution coefficients register stores said image resolution coefficients corresponding to the graphic image being drawn in said first frame buffer, and a resolution coefficients register stores said image resolution coefficients corresponding to said drawn image stored in said second frame buffer; and
- (f) synchronizing said double buffering of said drawn image with said double buffering of said image resolution, wherein said first frame buffer and said second frame buffer are swapped concurrent with the transfer of said image resolution coefficients from said buffered resolution coefficients register to said resolution coefficients register.

20. The method according to claim 17, further comprising the steps of:
   (d) drawing, within a time period of a single frame, said second graphic image of variable complexity to said second image resolution, thereby producing a second drawn image; and
   (e) if said second image resolution is less than the target resolution, magnifying said second drawn image to the target resolution, thereby producing a second display image.

21. A video graphics system, comprising:
   a pair of frame buffers, denoted by a first frame buffer and a second frame buffer, each of which receives a graphic image drawn to an image resolution, thereby storing a drawn image, wherein said first frame buffer receives said graphic image during a first frame and said second frame buffer receives a second graphic image during a second frame;
   a switch for pointing to said pair of frame buffers wherein said switch indicates whether said first frame buffer is receiving said graphic image or whether said second frame buffer is receiving said graphic image;
   a buffered resolution coefficients register for storing resolution coefficients associated with said graphic image currently being drawn to either said first frame buffer or said second frame buffer during said second frame;
   a resolution coefficients register for storing resolution coefficients associated with said drawn image currently stored in either said first frame buffer or said second frame buffer during said first frame;
   a swap buffer signal connected to said switch and said buffered resolution coefficients register wherein said swap buffer signal causes said switch to swap said first frame buffer and said second frame buffer and said buffered resolution coefficients register to output its stored resolution coefficients into said resolution coefficients register; and
   a video output controller for reading the contents of said first frame buffer, if said first frame buffer contains said drawn image, or said second frame buffer, if said second frame buffer contains said drawn image, and outputting said drawn image to a display device, wherein said drawn image is magnified by said resolution coefficients stored in said resolution coefficients register prior to said outputting of said drawn image.

22. A video graphics system connected to a plurality of display devices, wherein each said display device has a unique channel, each channel comprising:
   a pair of frame buffers, denoted by a first frame buffer and a second frame buffer, each of which receives a graphic image drawn to an image resolution, thereby storing a drawn image, wherein said first frame buffer receives said graphic image during a first frame and said second frame buffer receives a second graphic image during a second frame;
   a switch for pointing to said pair of frame buffers wherein said switch indicates whether said first frame buffer is receiving said graphic image or whether said second frame buffer is receiving said graphic image;
   a buffered resolution coefficients register for storing resolution coefficients associated with said graphic image currently being drawn to either said first frame buffer or said second frame buffer during said second frame;
   a resolution coefficients register for storing resolution coefficients associated with said drawn image currently stored in either said first frame buffer or said second frame buffer during said first frame;
   a swap buffer signal connected to said switch and said buffered resolution coefficients register wherein said swap buffer signal causes said switch to swap said first frame buffer and said second frame buffer and said buffered resolution coefficients register to output its stored resolution coefficients into said resolution coefficients register; and
   a video output controller for reading the contents of said first frame buffer, if said first frame buffer contains said drawn image, or said second frame buffer, if said second frame buffer contains said drawn image, and outputting said drawn image to a display device, wherein said drawn image is magnified by said resolution coefficients stored in said resolution coefficients register prior to said outputting of said drawn image.

23. A video graphic system for dynamically resizing graphic images of variable complexity, comprising:
   a plurality of drawing means for drawing graphic images to an image resolution thereby producing drawn images;
   determining means for determining an image resolution for at least one of said graphic images; and
   a plurality of magnifying means for magnifying said drawn images to a target resolution, thereby generating display images;
   wherein one of said plurality of drawing means and said determining means execute within a time period of a single frame, and each of said plurality of magnifying means executes within a time period of said single frame, and
   wherein one said drawing means and one said magnifying means correspond to a channel of a display device, thereby providing independent dynamic resizing of graphic images of variable complexity across multiple channels.

24. A video graphic system according to claim 23, wherein each of said plurality of magnifying means comprises bi-linear interpolation.

25. A video graphic system according to claim 23, wherein each of said plurality of magnifying means comprises linear interpolation.

26. A video graphic system according to claim 23, wherein each of said plurality of magnifying means comprises bi-cubic interpolation.

27. A video graphic system according to claim 23, wherein at least one of said magnifying means executes concurrently with at least one of said drawing means.

28. A video graphic system according to claim 23, wherein said determining means compares the computational time for drawing a graphic image preceding said at least one of said graphic images with said time period of said single frame.

29. A video graphic system according to claim 28, further comprising:
   first determining means for determining if said computational time exceeds a high-water mark, wherein if said high-water mark is exceeded, said image resolution for said at least one of said graphic images is determined to be less than the image resolution at which said graphic image preceding said at least one of said graphic images was drawn; and second determining means for determining if said computational time falls below a low-water mark, wherein if said computational time falls below said low-water mark and the image resolution at which said graphic image preceding said at least one of said graphic images was drawn does not equal said target resolution, said image resolution for said at least one of said graphic images is determined to be greater than the image resolution at which said graphic image preceding said at least one of said graphic images was drawn, otherwise said image resolution for said at least one of said graphic images is determined to be said target resolution.

30. A video graphic system according to claim 23, further comprising double buffering means to double buffer said graphic images, wherein a first frame buffer receives one of said drawn images produced by one of said drawing means during a first frame, and a second frame buffer contains a previously drawn image produced by said one of said drawing means during a second frame, wherein said previously drawn image is magnified by one of said magnifying means during said first frame, and wherein said second frame is a time period immediately preceding said first frame.

31. A video graphic system according to claim 30, wherein said one of said drawing means and said one of said magnifying means are synchronized by a swap buffer signal.

32. In a computer-based system having a computer graphics system, a method for dynamically resizing a graphic image of variable complexity to generate a display image of a target resolution at a constant frame rate, comprising the steps of:
(a) drawing, within a time period of a single frame, the graphic image of variable complexity to a first image resolution, thereby producing a drawn image;
(b) determining, within said time period of said single frame, a second image resolution for a second graphic image of variable complexity, wherein the graphic image of variable complexity precedes said second graphic image, and wherein said determining step comprises the steps of:
   comparing a computational time for drawing the graphic image of variable complexity to a high-water mark, wherein if said computational time exceeds said high-water mark, said second image resolution is determined to be less than said first image resolution; and
   comparing said computational time to a low-water mark, wherein if said computational time is less than said low-water mark and said first image resolution does not equal the target resolution, said second image resolution is determined to be greater than said first image resolution, otherwise said second image resolution is determined to be said target resolution; and
(c) if said first image resolution is less than the target resolution, magnifying said drawn image to the target resolution, thereby producing the display image.

33. A method according to claim 32, wherein said step (c) executes within a time period of one frame and executes concurrently with said steps (a) and (b) which also execute within said time period of one frame.

34. A method according to claim 32, further comprising the steps of:
(d) double buffering said drawn image, wherein a first frame buffer receives the graphic image being drawn in step (a) during a first frame, and a second frame buffer stores a previously drawn image produced during a second frame, wherein said second frame is a time period immediately preceding said first frame;
(e) double buffering said image resolution, wherein a buffered resolution coefficients register stores said image resolution coefficients corresponding to the graphic image being drawn in said first frame buffer, and a resolution coefficients register stores said image resolution coefficients corresponding to said drawn image stored in said second frame buffer; and
(f) synchronizing said double buffering of said drawn image with said double buffering of said image resolution, wherein said first frame buffer and said second frame buffer are swapped concurrent with the transfer of said image resolution coefficients from said buffered resolution coefficients register to said resolution coefficients register.

35. In a computer-based system having a computer graphics system, a method for dynamically resizing a graphic image of variable complexity to generate a display image of a target resolution at a constant frame rate, said steps comprising:
(a) drawing the graphic image of variable complexity to a first image resolution, thereby producing a drawn image;
(b) determining a second image resolution for a subsequent graphic image of variable complexity of said drawn image;
(c) magnifying said drawn image to the target resolution, thereby producing the display image;
(d) double buffering said drawn image, wherein a first frame buffer receives the graphic image being drawn in step (a) during a first frame, and a second frame buffer stores a previously drawn image produced during a second frame, wherein said second frame is a time period immediately preceding said first frame;
(e) double buffering said image resolution, wherein a buffered resolution coefficients register stores said image resolution coefficients corresponding to the graphic image being drawn in said first frame buffer, and a resolution coefficients register stores said image resolution coefficients corresponding to said drawn image stored in said second frame buffer; and
(f) synchronizing said double buffering of said drawn image with said double buffering of said image resolution, wherein said first frame buffer and said second frame buffer are swapped concurrent with the transfer of said image resolution coefficients from said buffered resolution coefficients register to said resolution coefficients register.

36. A method according to claim 35, wherein said steps (a) and (b) execute within a time period of one frame.

37. A method according to claim 36, wherein said step (c) executes within a time period of one frame and executes concurrently with said steps (a) and (b) which also execute within said time period of one frame.

38. A method according to claim 36, wherein said step (b) comprises a comparison of a computational time for drawing the graphic image of variable complexity with said time period of said single frame.

39. A method according to claim 38, wherein said step (b) further comprises:

(d) comparing said computational time to a high-water mark, wherein if said high-water mark is exceeded, said second image resolution is determined to be less than said first image resolution; and (e) comparing said computational time to a low-water mark, wherein if said computational time falls below said low-water mark and said first image resolution is less than said target resolution, said second image resolution is determined to be greater than said first image resolution, otherwise said second image resolution is determined to be said target resolution.

* * * * *

UNITED STATES PATENT AND TRADEMARK OFFICE
CERTIFICATE OF CORRECTION

PATENT NO. : 5,889,529
DATED : March 30, 1999
INVENTOR(S) : Jones et al.

It is certified that error appears in the above-identified patent and that said Letters Patent is hereby corrected as shown below:

In column 9, line 37, please insert the word --if-- after the word "determines".

In column 10, lines 10-18, please delete the following:

"16. A video graphic system according to claim 7, further comprising:
a plurality of drawing means; and
a plurality of magnifying means;
wherein one said drawing means and one said magnifying means correspond to a channel of a display device thereby providing independent dynamic resizing of graphic images of variable complexity across multiple channels."

In column 10, line 23, please replace "side" with --said--.

Signed and Sealed this

Twenty-second Day of August, 2000

*Attest:*

Q. TODD DICKINSON

*Attesting Officer*  *Director of Patents and Trademarks*